United States Patent
Hathaway

[11] 3,788,655
[45] Jan. 29, 1974

[54] GROMMET SEALING ARRANGEMENT

[75] Inventor: John G. Hathaway, St. Clair Shores, Mich.

[73] Assignee: General Motors Corporation, Detroit, Mich.

[22] Filed: July 10, 1972

[21] Appl. No.: 270,455

[52] U.S. Cl................. 277/212 F, 174/153 G, 16/2
[51] Int. Cl...... F16l 5/02, H01b 17/30, B23p 11/02
[58] Field of Search...277/212 R, 212 C, 212 F; 16/2; 174/153 G, 152 G, 65 G

[56] References Cited
UNITED STATES PATENTS

| | | | |
|---|---|---|---|
| 1,788,414 | 1/1931 | Stevenson | 277/212 F |
| 2,897,533 | 8/1959 | Bull et al. | 277/212 X |
| 3,518,359 | 6/1970 | Trimble et al. | 174/153 |

Primary Examiner—Samuel B. Rothberg
Attorney, Agent, or Firm—H. Furman

[57] ABSTRACT

An arrangement for sealing an apertured panel through which a member is inserted utilizes a grommet of a generally flexible material. An annular edge of the panel defines the aperture and the member has an annular outer surface received in spaced relationship to the annular edge of the panel after it is inserted through the circular aperture. The grommet is inserted within the aperture prior to the member and includes a head flange portion integral with sealing and guide portions. The head flange portion has a generally annular configuration with a surface engaging one side of the panel adjacent the annular edge of the circular aperture. The sealing portion is received within the aperture and has a cross section with a thin-walled equilateral polygonal configuration. The totals of the lengths of the inner and outer sides of the sealing portion are respectively substantially equal to the circumferences of the annular outer surface of the member and the annular edge of the panel. Consequently, the junctures of the sides of the sealing portion grip the annular edge of the panel to initially position the grommet, and the sealing portion deforms during insertion of the member to assume an annular configuration sealing against both the member and the panel. The guide portions of the grommet normally extend from the respective sides of the sealing portion with a generally frustoconical configuration pointed away from the head flange portion so as to guide the grommet during insertion within the circular aperture of the panel. The guide portions expand to a split annular configuration during the insertion of the member.

3 Claims, 7 Drawing Figures

PATENTED JAN 29 1974 3,788,655

GROMMET SEALING ARRANGEMENT

BACKGROUND OF THE INVENTION

This invention relates generally to an arrangement utilizing a generally flexible grommet to seal an apertured panel through which a member is inserted.

Many manufactured items utilize generally flexible grommets for sealing apertured panels through which members are inserted. For instance, vehicle bodies include many panels with annular apertures through which various components with circular cross sections extend. These components may be electric wires, control cables, heating ducts or control linkages, etc. The annular spacings between these components and the panels must necessarily be sealed to prevent the leakage of moisture into the vehicle bodies during inclement weather conditions. This sealing is generally provided by grommets composed of a generally flexible material. The grommets most often have generally annular configurations with outer annular grooves for receiving the annular panel edges defining the apertures. Annular lips of the grommets on each side of these grooves engage the panels to initially maintain the grommets in position prior to insertion of the components through the panels. Certain manufacturing operations, either by way of steps during the molding process or by subsequent machining processes, are required to provide the grommets with these annular grooves. These manufacturing operations may result in an expense prohibiting the use of a particular grommet for a certain vehicle application.

SUMMARY OF THE INVENTION

One feature of this invention is that it provides a sealing arrangement in which a grommet has a sealing portion with a cross section of a thin-walled equilateral polygonal configuration received within a circular aperture of a panel so that the junctures of the sides of the sealing portion normally grip the annular edge of the panel to initially position the grommet while allowing the sealing portion to assume an annular sealing configuration upon subsequent insertion through the panel and grommet of a member with an annular outer surface.

Another feature of the invention is that it provides such a sealing arrangement in which the grommet has a generally annular head flange portion at one of its ends for sealing against one side of the panel adjacent to the aperture, and has guide portions extending from the respective sides of the sealing portion with a frustoconical configuration pointed away from the head flange portion so as to guide the grommet during its insertion within the aperture of the panel and to subsequently expand to a split annular configuration during insertion of the member.

BRIEF DESCRIPTION OF THE DRAWINGS

The above detailed features and other features of this invention are readily apparent from the following description of the preferred embodiment and the drawings in which.

DESCRIPTION OF THE PREFERRED EMBODIMENT

Figure 1:
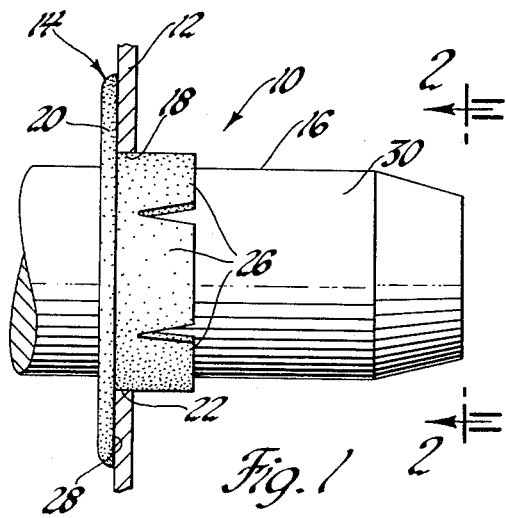
FIG. 1 is a partial sectional view showing a sealing arrangement in which a cylindrical member with an annular outer surface is received within a grommet in a circular aperture of a panel in a manner providing sealing between the opposite sides of the panel.
Figure 2:
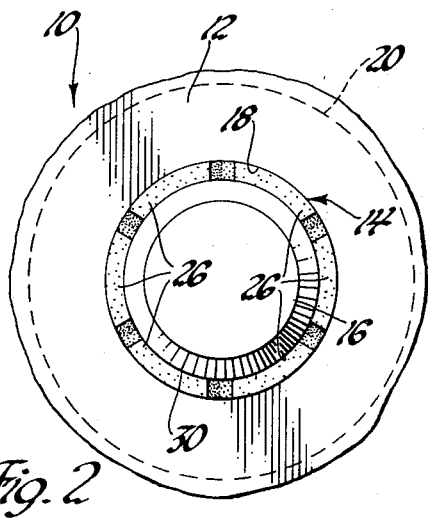
FIG. 2 is an end view of the sealing arrangement taken generally along line 2—2 of FIG. 1.

Referring to FIGS. 1 and 2 of the drawings, a sealing arrangement according to this invention is generally indicated by 10 and includes a panel 12, a grommet 14 of a generally flexible material such as rubber, and a cylindrical member 16 which extends through the panel and the grommet.

Figure 3:
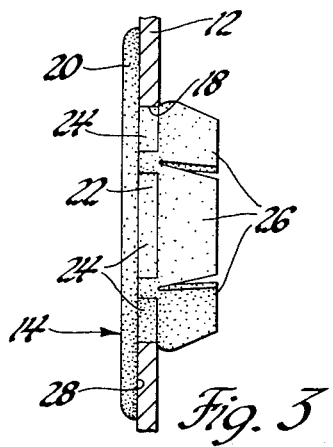
FIGS. 3 and 4 are views taken generally in the same directions as FIGS. 1 and 2, respectively, and show the manner in which the grommet is initially held in position within the aperture of the panel prior to insertion of the cylindrical member through the panel.
Figure 4:
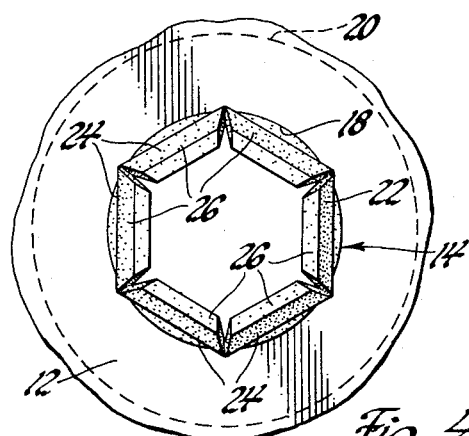
Figure 5:
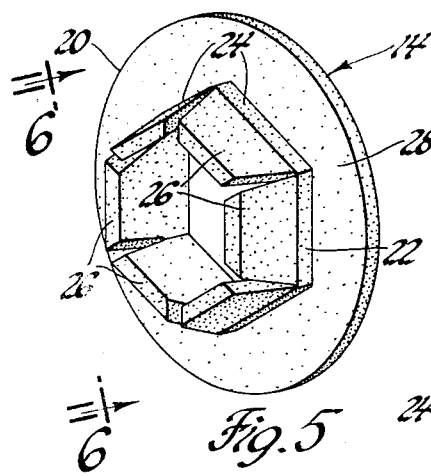
FIG. 5 is a perspective view of the grommet.
Figure 7:
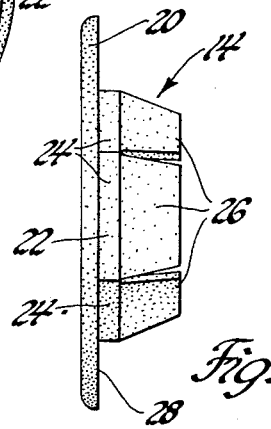
FIG. 7 is a side view of the grommet taken along line 7—7 of FIG. 6.
Figure 6:
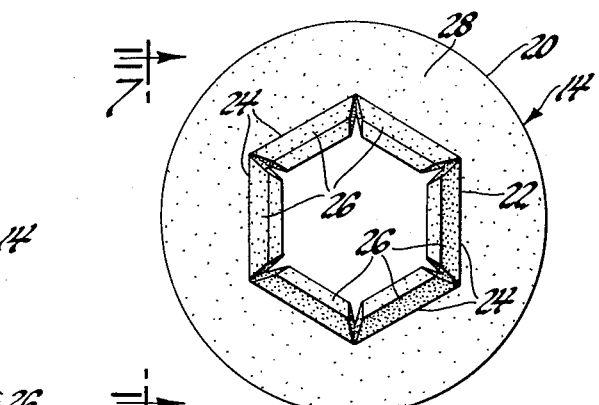
FIG. 6 is an end view of the grommet taken along line 6—6 of FIG. 5.

As can be seen by additionally referring to FIGS. 3 and 4, the panel 12 includes an annular edge 18 defining a circular aperture for receiving both the grommet 14 and the cylindrical member 16. The grommet is shown by FIGS. 5 through 7 as including a generally annular head flange portion 20, a thin-walled equilateral hexagonal sealing portion 22 with sides 24 extending perpendicularly from the head flange portion 20, and six guide portions 26 respectively extending from the sides of the sealing portions with a frustoconical configuration pointed away from the head flange portion.

The assembled condition of the sealing arrangement is provided by first inserting the grommet 14 within the circular aperture of the panel to the position shown by FIGS. 3 and 4. The outer configuration of the free end of the guide portions 26 has a smaller size than the circular aperture and is initially received within the aperture such that the tapering nature of the guide portions 26 guides the grommet while it moves to the fully inserted position. A surface 28 of the head flange portion 20 seals against one side of panel 12 adjacent the aperture and prevents movement of the grommet past this position. The sides 24 of the sealing portion 22 have a total outer circumference substantially equal to the circumference of annular edge 18. Consequently, when the grommet is in an undeformed or free condition, the junctures of these sides normally assume positions located radially outward of a circle concentric with the sealing portion and having a diameter equal to the diameter of the annular edge 18. The junctures of these sides are thus deformed during the insertion of the grommet within the aperture and, consequently, grip the annular edge 18 of the panel to initially position the grommet prior to the insertion of cylindrical member 16.

The cylindrical member 16 is subsequently inserted through the opening defined by the head flange portion 20 of the grommet and through the panel to expand the sealing portion 22 to an annular configuration and the guide portions 26 to a split annular configuration. The inner circumference of the sides 24 of the sealing portion is substantially equal to the circumference of the annular outer surface 30 of the cylindrical member such that the sealing portion provides effective sealing against cylindrical member 16. Since the outer circumference of the sides 24 is substantially equal to the circumference of the annular edge 18, the sealing portion 22 also seals effectively against the annular edge 18 of the panel.

The sealing portion 22 of the grommet should have a thin-walled configuration to provide good sealing characteristics. This thin-walled configuration requires that the diameter of the cylindrical member 16 be at least 80 percent of the diameter of annular edge 18. Preferably, the diameter of member 16 will be greater than 90 percent of the diameter of annular edge 18. This restraint is required in order to maintain substantial uniformity in the radial wall thickness of the sides 24 at their junctures and intermediate these locations so that the grommet provides effective sealing against both the cylindrical member and the annular edge of the panel.

It is of course understood that the sealing portion 22 may have a different number of sides than six. As the number of sides 24 increases, the radial wall thickness of the sides becomes more uniform and better sealing is achieved. However, this increase reduces the degree to which the junctures of the sides extend beyond the annular edge 18 of the aperture and the consequent gripping power of the grommet. If the number of sides is maintained between six and 10, the radial wall thickness will be sufficiently uniform to provide adequate sealing and the gripping power of the grommet will be sufficient to provide the initial grommet positioning prior to insertion of cylindrical member 16.

The invention thus provides an improved sealing arrangement.

What is claimed is:

1. The combination comprising, a panel including an annular edge defining a circular aperture of a diameter $D_1$, a member for insertion through the aperture and having an annular outer surface with a diameter $D_2$ received within the aperture in spaced relationship to the annular edge of the panel, $D_2$ being greater than 80 percent of $D_1$, and a generally flexible grommet for insertion within the aperture prior to the insertion of the member and including integral head flange and sealing portions, the head flange portion being engageable with one side of the panel adjacent the annular edge thereof and defining an aperture through which the member is inserted, the sealing portion being received within the aperture in the panel and having a cross section with a thin-walled equilateral polygonal configuration, the totals of the lengths of the inner and outer sides of the sealing portion being respectively substantially equal to the circumferences of the annular outer surface of the member and the annular edge of the panel to allow the junctures of these sides to grip the annular edge of the panel and initially position the grommet prior to the insertion of the member, and the sealing portion being deformed during the insertion of the member to assume an annular configuration in sealing engagement with both the member and the panel.

2. The combination of claim 1 wherein the sealing portion has six to 10 sides.

3. The combination comprising, a panel including an annular edge defining a circular aperture of a diameter $D_1$, a member for insertion through the aperture and having an annular outer surface with a diameter $D_2$ received within the aperture in spaced relationship to the annular edge of the panel, $D_2$ being greater than 80 percent of $D_1$, and a generally flexible grommet for insertion within the aperture prior to the member and including a head flange portion integral with a sealing portion and guide portions, the head flange portion having a generally annular configuration with a surface engaging one side of the panel adjacent to the annular edge thereof and defining a central aperture through which the member is inserted, the sealing portion being received within the aperture in the panel and having a cross section with a thin-walled equilateral polygonal configuration, the totals of the lengths of the inner and outer sides of the sealing portion being respectively substantially equal to the circumferences of the annular outer surface of the member and the annular edge of the panel to allow the junctures of these sides to grip the annular edge of the panel and initially position the grommet prior to the insertion of the member, the sealing portion being deformed during the insertion of the member to assume an annular configuration in sealing engagement with both the member and the panel, and the guide portions normally extending from the respective sides of the sealing portion with a frustoconical configuration pointed away from the head flange portion so as to guide the grommet during insertion within the aperture in the panel and to subsequently expand to a split annular configuration during the insertion of the member.

* * * * *